United States Patent Office 2,912,455
Patented Nov. 10, 1959

2,912,455

CHEMICAL PROCESS FOR THE PREPARATION OF PRIMARY AND SECONDARY CYANO ALKANES

Robert A. Smiley, Woodbury, N.J., assignor to E. I. du Pont de Nemours and Company, Wilmington, Del., a corporation of Delaware No Drawing. Application July 25, 1957
Serial No. 674,049

6 Claims. (Cl. 260—465.8)

The present invention relates to a process for the preparation of cyano alkanes. More particularly, the present invention relates to a process for the preparation of cyano alkanes from halo alkanes and metal cyanides.

The cyano alkanes are very valuable starting materials and intermediates for a wide variety of organic syntheses, such as the preparation of fatty acids and of amines. For example, adiponitrile has found extensive use as an intermediate in the synthesis of nylon. In general, the cyano alkanes are prepared most conveniently by the metathesis of a halo alkane and a metal cyanide, because of the ready availability of compounds of both of these classes. Heretofore, however, this metathesis method has not been completely satisfactory from the standpoint of the reaction rate and/or the yield of the desired cyano alkane. For example, Joyce in U.S. Patent 2,425,426 discloses that 6,6,6-trichlorocapronitrile was prepared in 44% yield by refluxing 1,1,1,5-tetrachloropentane, n-propanol, and aqeous sodium cyanide solution for 21 hours. The preparation of cyanodecane in a 95% yield by refluxing decyl chloride and potassium cyanide in aqueous alcohol for 96 hours also has been reported in the literature (Fierz-David and Kuster, Helv. Chim. Acta, 22, 82 (1939)). Obviously, the obtaining of high yields by this metathesis as conventionally effected requires the use of exceedingly long reaction periods, and, on a commercial basis, reaction times of such long duration are highly disadvantageous. The need is evident for an improved metathesis process for the preparation of cyano alkanes.

Accordingly, an object of the present invention is to provide a simple and economical process for the preparation of cyano alkanes. Another object of the present invention is to provide an efficient process for the preparation of cyano alkanes wherein readily available starting materials are used. A further object of the present invention is to provide a process wherein the metathesis of a halo alkane and a metal cyanide is effected at a high rate and to give the desired cyano alkanes in good yields.

I have found that the foregoing objects may be achieved when I cause a halo alkane to react with a metal cyanide in dimethyl sulfoxide medium.

In accordance with the process of the present invention, a halo alkane and a metal cyanide are mixed together in a reaction zone containing dimethyl sulfoxide as the solvent, and the reaction zone is maintained at a temperature within the range of 20° C. and the boiling point of the dimethyl sulfoxide under the reaction conditions.

The following examples serve to illustrate specific embodiments of the method of carrying out the process of the present invention. However, they will be understood to be illustrative only and not as limiting the invention in any manner. Unless otherwise designated, the parts in the examples are parts by weight.

Example 1

Five parts of sodium cyanide and 88 parts of dimethyl sulfoxide were introduced into a reactor provided with means for agitation, and the mixture was heated on a steam bath. 1-chlorodecane (9 parts) was added to the mixture, and the contents of the reactor were heated, with agitation, for a period of 30 minutes, during which period sodium chloride precipitated. Then, the mixture was poured into 800 parts of water, and the oil which separated was extracted with diethyl ether. The extract was dried, and the ether was distilled off under vacuum. The oil from the extract was distilled to give 8 parts of hendecane-nitrile (1-cyanodecane): B.P.$_{1.2mm.}$, 87–88° C. and $n_D^{24}$, 1.4317.

Example 2

To a reactor fitted with a stirrer, thermometer, and dropping funnel was added 110 parts of sodium cyanide and 330 parts of dimethyl sulfoxide. The slurry was heated, with stirring, on a steam bath to about 80° C. Then, the reactor was removed from the steam bath, and 127 parts of 1,4-dichlorobutane was added dropwise to the slurry over a period of 5 minutes. When the reaction became exothermic during this addition (temperature rose as high as 160° C.), the reactor was placed in an ice bath. After the addition of the dichlorobutane was complete, the mixture was stirred rapidly for 5 minutes, then, the ice bath was removed and agitation stopped. After 10 more minutes (20 minutes total), the stirrer was started again, and the reaction mixture was cooled rapidly in the ice bath.

Chloroform (300 parts) was added to the mixture, which then was poured into 800 parts of water. The chloroform layer was separated, and the aqueous layer was extracted twice more with 150-part portions of chloroform. The combined extracts were washed once with saturated sodium chloride solution to remove the sulfoxide and dried. The chloroform was removed by distillation at atmospheric pressure, and the residue was distilled in vacuo. The foreshot (8 parts) was shown to be dimethyl sulfoxide. All the remaining material distilled at a constant 115° C. (0.7 mm.) to give 95 parts of adiponitrile ($n_D^{25}$, 1.4369). The amount of adiponitrile obtained represents a yield of 88%.

Example 3

Twenty parts of 2-chlorooctane was added to a well-stirred solution of 13 parts of sodium cyanide in 220 parts of dimethyl sulfoxide. This mixture was stirred at 140° C. for about two hours. After this time, the mixture was cooled and then diluted with water and extracted with diethyl ether. The extract was washed with a saturated sodium chloride solution and dried. The dried extract was distilled to give material boiling at 79° C. (10 mm.) which gave 15 parts of 2-cyanooctane having an index of refraction ($n_D^{25}$) of 1.4181.

Example 4

Various dichloro alkanes were treated with sodium cyanide in dimethyl sulfoxide according to the method of Example 3. The separatory procedure in run A was that used in Example 3, whereas in runs B and C the precipitated sodium chloride was removed by filtration and the cyano alkane was separated by direct distillation from the reaction mixture. The reaction conditions and results are listed in the following table.

| Run | Chloro Compd. (parts) | Wt. of NaCN (parts) | Wt. of Dimethyl Sulfoxide (parts) | Temp. (° C.) | Reaction Time (min.) | Cyano Alkane Obtd. | Parts of Nitrile |
|---|---|---|---|---|---|---|---|
| A | 1,5-Dichloro-pentane (14). | 14 | 143 | 90–150 | 45 | pimelonitrile | 9 |
| B | 1,2-Dichloro-ethane (15). | 15 | 165 | 90–140 | 20 | succinonitrile | 7 |
| C | 1,3-Dichloro-propane (21). | 19 | 193 | 90–110 | 30 | glutaronitrile | 12 |

*Example 5*

In order to compare the effectiveness of dimethyl sulfoxide as a solvent in the reaction of halo alkanes and metal cyanides with that of a solvent conventionally used in this reaction, two runs were made under essentially identical conditions with the exception that in one run (run II) ethylene glycol monomethyl ether was and the reaction time was 2 minutes and in the other run (run II) ethylene glycol momomethyl ether was used as the solvent and the reaction time was 7 minutes. In both runs, 9 parts of 1-chlorodecane was added to 5 parts of sodium cyanide in 88 parts of the solvent at 95° C. The sodium cyanide dissolved in the sulfoxide but remained undissolved in the ether. After the specified reaction time, both reaction mixtures were poured into 500 parts of water, and the insoluble oil was separated. In run I, a quantitative yield of 1-cyanodecane ($n_D^{26}$, 1.4310) was obtained, whereas in run II, the 1-chlorodecane ($n_D^{26}$, 1.4347) was recovered substantially completely. Obviously, the reaction effected in dimethyl sulfoxide went to completion in 2 minutes, whereas very little reaction, if any, occurred in the ether even after a 7-minute reaction period.

As may be seen by reference to the foregoing examples and especially to Example 5, the desired cyano alkanes are obtained in good yields and in exceedingly short reaction periods when dimethyl sulfoxide is used as the solvent in the metathesis of a halo alkane and a metal cyanide. Although I do not wish to be limited by a theoretical discussion of the reaction, the increased reaction rate occasioned by the use of the sulfoxide as the solvent appears to be due to the increased solubility of the metal cyanide in this solvent as compared with that in the solvents conventionally used, as for example, the glycol ether used in run II of Example 5 and the aqueous alcohol of the prior art processes.

Neither the amount of dimethyl sulfoxide used nor the proportion of reactants is critical to the process of the present invention. Sufficient sulfoxide is used to form either a solution of the reactants or a thin slurry of the metal cyanide, a three-fold amount by weight of the sulfoxide forming an easily stirred slurry, but greater and lesser amounts also being suitable. Good results were obtained when substantially stoichiometric amounts of the reactants were used, and also when an excess of the metal cyanide was present. In fact, there is some evidence indicating that the presence of excess cyanide increases the reaction rate. Therefore, the presence of at least a stoichiometric amount of the cyanide in the reaction mixture is preferable.

The process may be effected at temperatures within the range of 20° C. and the boiling point of dimethyl sulfoxide under the reaction conditions. The use of lower temperatures results in increased reaction times and is impractical, whereas the use of higher temperatures results in the loss of the sulfoxide. Moreover, since operation at the lower temperatures within the operable range requires considerable external cooling due to the exothermic nature of the reaction, the use of temperatures of about 80–150° C. is preferred. The reaction proceeds satisfactorily at atmospheric pressure, and, therefore, the use of superatmospheric pressures is unnecessary. However, if operation at higher temperatures, i.e., above the boiling point of the sulfoxide at atmospheric pressure, is desired for any reason, the reaction system can be pressurized without any deleterious effects upon the reaction.

The specific reaction time is not critical. The time required for completion of the reaction is very short, i.e. a matter of minutes, or, at most, a couple of hours, due to the high rate of reaction. Therefore, the long reaction times required in the processes of the prior art, i.e. many hours and even days, are eliminated, and improvements in the economics of the process thereby are realized. The reaction time, of course, is somewhat dependent upon the reaction temperature, shorter reaction times resulting when higher reaction temperatures are used. Therefore, in the case of the secondary halo alkanes, which tend to react more slowly than do the primary halo alkanes, the use of the higher reaction temperatures may be desirable to decrease the reaction time.

The critical feature of the present invention is the use of dimethyl sulfoxide as a solvent in the well-known metathesis of halo alkanes and metal cyanides. Any one of the soluble or partially soluble metal cyanides conventionally used in this metathesis is suitable for use in the process of the present invention. Such cyanides include the alkali-metal cyanides, for example sodium and potassium cyanide, and cuprous cyanide, among others. Because of its ready availability and low cost, sodium cyanide was exemplified and is preferred. The reaction, of course, is general for alkanes having one or two primary or secondary halo substituents, such as chloro, bromo, or iodo groups. In addition to the exemplified chlorodecane, chlorooctane, and dichloro-ethane, -propane, -butane, and -pentane, suitable halo alkanes are: bromohexane, iodoheptane, and secondary chlorononane, among others.

The process has been exemplified as a batchwise process. However, equally feasible is the carrying out of the process in a continuous manner. For example, the cyanide and the halo alkane could be introduced continuously into a reaction zone containing dimethyl sulfoxide at the desired reaction temperature, while the product could be continuously removed from the reactor. After separation of the desired cyano alkane, as for example by extraction or distillation, if desired, the by-product inorganic chloride could be removed by filtration, and the rest of the reaction mixture could be recycled.

The invention has been described in detail in the foregoing. However, it will be apparent to those skilled in the art that many variations are possible without departure from the scope of the invention. I intend, therefore, to be limited only by the following claims.

I claim:

1. A process for the preparation of primary and secondary cyano alkanes which comprises the admixture in the presence of dimethyl sulfoxide as solvent of an alkali-metal cyanide with a halo alkane selected from the group consisting of primary and secondary mono- and dihaloalkanes selected from the group consisting of chloro-, bromo-, and iodoalkanes.

2. A process for the preparation of primary and secondary cyano alkanes which comprises the admixture in the presence of dimethyl sulfoxide as solvent of an alkali-metal cyanide with a halo alkane selected from the group consisting of primary and secondary mono- and dihaloalkanes selected from the group consisting of chloro-, bromo-, and iodoalkanes at a temperature within the range of 20° C. and the boiling point of said dimethyl sulfoxide under the reaction conditions.

3. Process according to claim 2, wherein the alkali-metal cyanide is present in the reaction mixture in at least substantially stoichiometric amount.

4. Process according to claim 2, wherein the metal cyanide is sodium cyanide.

5. A process for the preparation of adiponitrile which comprises the admixture in the presence of dimethyl sulfoxide as solvent of an alkali-metal cyanide with 1,4-dichlorobutane at a temperature within the range of 20° C. and the boiling point of said dimethyl sulfoxide.

6. Process according to claim 5, wherein the metal cyanide is sodium cyanide.

References Cited in the file of this patent

UNITED STATES PATENTS

| | | |
|---|---|---|
| 2,365,898 | Morris et al. | Dec. 26, 1944 |
| 2,539,871 | Smedslund | Jan. 30, 1951 |
| 2,715,137 | Copelin | Aug. 9, 1955 |
| 2,779,781 | Copelin et al. | Jan. 29, 1957 |
| 2,786,072 | Copelin et al. | Mar. 19, 1957 |

UNITED STATES PATENT OFFICE
CERTIFICATE OF CORRECTION

Patent No. 2,912,455                                               November 10, 1959

Robert A. Smiley

It is hereby certified that error appears in the printed specification of the above numbered patent requiring correction and that the said Letters Patent should read as corrected below.

Column 3, line 19, for "(run II) ethylene glycol monomethyl ether was" read -- (run I) dimethyl sulfoxide was used as the solvent --.

Signed and sealed this 17th day of May 1960.

(SEAL)
Attest:

KARL H. AXLINE                                           ROBERT C. WATSON

Attesting Officer                                       Commissioner of Patents